UNITED STATES PATENT OFFICE.

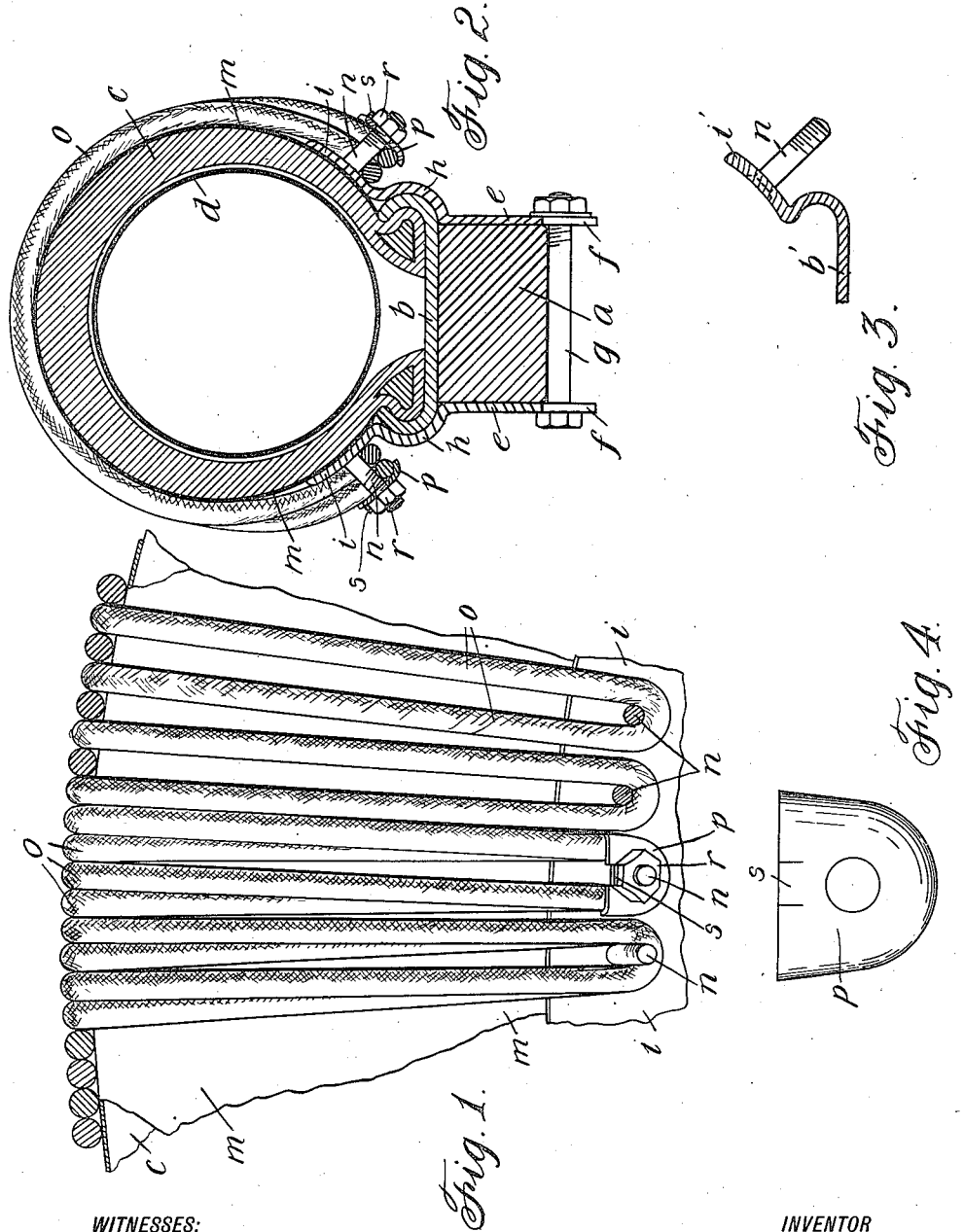

DAVID W. FREEMAN, OF MIST, OREGON.

TIRE-PROTECTOR.

1,193,533.  Specification of Letters Patent.  Patented Aug. 8, 1916.

Application filed February 14, 1916. Serial No. 78,320.

*To all whom it may concern:*

Be it known that I, DAVID W. FREEMAN, a citizen of the United States, and a resident of Mist, Columbia county, State of Oregon, have invented a certain new and useful Improvement in Tire - Protectors, of which the following is a specification.

This invention relates generally to tire protectors and has particularly to do with a removable and flexible protective casing adapted to be used in connection with any cushion or pneumatic tire of the type usually used on automobiles.

One of the main objects of this invention is to provide a simple and efficient means for incasing the tire with an inexpensive but durable wearing tread which will absorb all of the wear of travel. When this protective casing is worn out it may be readily replaced and the tire itself will suffer no deterioration.

It is further the object of my invention to arrange the protective casing so that it will present a smooth and resilient tread securely fixed on the tire but easily removable when occasion requires.

In the accompanying drawings: Figure 1 is a fragmental side elevation, partly in section, of a pneumatic tire provided with my protective casing; Fig. 2 is a smaller-scaled transverse section of the wheel, showing my casing arranged thereon; Fig. 3 is a fragmental view showing an alternate detail of construction; and Fig. 4 is a larger scaled plan view of the washer used in connection with my device.

Referring to Fig. 2, $a$ represents the felly of an automobile wheel, $b$ is the clencher rim, $c$ the tire, and $d$ is the inner tube. This form represents the usual construction of a standard automobile wheel.

Clamped on each side of the wheel is a ring $e$, provided at intervals with ears $f$, by means of which the opposite rings may be secured together by the bolts $g$. Each of these rings may be made integral or sectional. Extending entirely around the body of each ring is a concaved portion $h$, adapted to seat over the clencher rim $b$, and the outer portion $i$ of said ring forms a concaved seat adapted to support the tire. A sheathing $m$ which may be of canvas, leather or other flexible yet durable material, covers the tire $c$ and has its sides clamped between the tire and the outer portions $i$ of the rings. Studs $n$, having their outer ends threaded, are rigidly mounted on the outer portions of the rings, and have their inner ends countersunk and riveted over so as to make the inner sides of the rings smooth. A continuous cable $o$ is first wound alternately around these studs, as shown at the right side of Fig. 1. The studs are so spaced apart and the cable is of such diameter that the tread portions of adjacent convolutions of the cable will be spaced apart a distance approximately equal to the diameter of the cable. In this way, after the cable has been completely wound around the tire once it may be rewound the second time, and the spaces between the tread portions of the first winding will then be filled by the convolutions of the second winding of the cable. The ends of the cable may be secured by any suitable means, which are not detailed herein, as they form no part of the present invention. After the cable has been completely wound twice around the wheel, the concaved washers $p$, which are adapted to fit over the turns of the cable, are placed in position, and the nuts $r$ are threaded into place so as to clamp the cable firmly in position. The lip $s$ of each washer is then bent laterally adjacent one side of the nut so as to lock the latter securely in place.

The construction shown in Fig. 3 provides a special form of clencher rim $b^1$, in which the ring $i$ is formed integrally therewith.

I claim:

1. In a device of the character described, the combination with a wheel and a tire thereon, of parallel rings rigidly mounted on the sides of the wheel, lateral studs projecting outwardly from the rings, a continuous cable wound alternately around said studs twice around the periphery of the wheel, and said studs being so located that the consecutive convolutions of each winding of the cable will be spaced apart a distance approximately equal to the diameter of the cable.

2. In a device of the character described, the combination with a wheel and a tire thereon, of parallel rings rigidly mounted on the sides of the wheel, lateral studs projecting outwardly from the rings, a continuous cable wound alternately around said studs, twice around the periphery of the wheel, said studs being so located that the consecutive convolutions of each winding of the cable will be spaced apart a distance approximately equal to the diameter of the cable, and concaved washers adapted to bear on the turns of the cable.

3. In a device of the character described, the combination with a wheel and a tire thereon, of parallel rings rigidly mounted on the sides of the wheel, lateral threaded studs projecting outwardly from the rings, a continuous cable wound alternately around said studs twice around the periphery of the wheel, concaved washers adapted to bear on the turns of the cable, and nuts threaded on the studs for holding said washers rigidly in place.

4. In a device of the character described, the combination with a wheel and a tire thereon, lateral studs projecting outwardly from the wheel, a continuous cable wound alternately around said studs, and means for clamping the cable against movement relative to the studs.

DAVID W. FREEMAN.